United States Patent
Leisten

(10) Patent No.: US 9,331,591 B2
(45) Date of Patent: May 3, 2016

(54) PRIMARY-SIDE BURST MODE CONTROL SCHEME FOR LLC CONVERTERS

(71) Applicant: Texas Instruments Incorporated, Dallas, TX (US)

(72) Inventor: Joseph M. Leisten, Cork (IE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 42 days.

(21) Appl. No.: 14/209,211

(22) Filed: Mar. 13, 2014

(65) Prior Publication Data
US 2014/0307478 A1    Oct. 16, 2014

(30) Foreign Application Priority Data

Apr. 5, 2013 (GB) .................................. 1306211

(51) Int. Cl.
*H02M 3/335* (2006.01)
*H02M 1/00* (2006.01)

(52) U.S. Cl.
CPC .. *H02M 3/33523* (2013.01); *H02M 2001/0035* (2013.01); *H02M 2001/0058* (2013.01); *Y02B 70/1491* (2013.01); *Y02B 70/16* (2013.01)

(58) Field of Classification Search
CPC ................. H02M 3/33523; H02M 2001/0035; H02M 2001/0058; Y02B 70/1491; Y02B 70/16
USPC ........................................... 363/21.02, 21.03
See application file for complete search history.

(56) References Cited

PUBLICATIONS

ST, Datasheet for L6599, Feb. 2009, ST, Rev. 3, 1-36.*

* cited by examiner

*Primary Examiner* — Jue Zhang
(74) *Attorney, Agent, or Firm* — William B. Kempler; Frank D. Cimino

(57) ABSTRACT

An LLC converter having a primary side burst control circuit, and a secondary side regulator circuit. The primary side burst control circuit has an inner feedback loop circuit for adjusting the LLC operating frequency to control the power drawn by the LLC converter proportional to an optical feedback signal.

6 Claims, 2 Drawing Sheets

PRIMARY-SIDE BURST MODE CONTROL SCHEME FOR LLC CONVERTERS

CROSS-REFERENCE TO RELATED APPLICATIONS

This patent application claims priority from Provisional Great Britain Patent Application No. 1306211.2, filed Apr. 5, 2013, which is incorporated herein by reference in its entirety.

BACKGROUND OF THE INVENTION

Power Supplies based upon the LLC Power Conversion topology can offer high switching frequency and excellent full power efficiency due to the inherent Zero Voltage Switching offered by this topology. For this reason, the LLC power conversion topology is used in a wide range of applications including digital televisions. The main drawback of LLC converters in this type of application is their poor light load efficiency.

Operating the LLC converter in Burst mode allows us to greatly improve the effective light load efficiency that can be achieved. In Burst mode the LLC converter operates at relatively high power for a short period of time while charging the output capacitor with energy. Between Bursts the LLC converter is turned OFF and the load is supplied from the output capacitor. Overall efficiency is greatly improved because while it is operating the LLC is delivering relatively high power, with good efficiency, and between bursts the LLC is switched OFF so it does not incur the normal switching power losses.

Burst mode operation with a primary side controller is well known for topologies in which the Optical Feedback signal from the secondary side is used to control directly the power delivery. An example of such a converter topology would be a peak current mode controlled DCM Flyback converter. In this topology the Feedback signal is used to control the peak current (hence the energy stored) in the magnetising inductor at the end of the ON period of the switch. This energy level will all (apart from some efficiency losses) be transferred to the output during the remainder of the switching cycle. There is therefore a direct link between the Feedback signal level and the energy delivered to the load. Burst operation can therefore be achieved simply by setting two thresholds on the Feedback signal, at the desired corresponding load power level, such that when the Feedback calls for a low power the power switching is disabled, and when the Feedback calls for a high power level the power switching is re-started. Provided some hysteresis band exists between the turn-on and turn-off thresholds the Burst operation will switch cleanly between the two states. The mark space ratio achieved will depend upon the current level of load power versus the position of the turn-on and turn-off thresholds. The Burst frequency achieved and output ripple voltage will depend upon the size of the output capacitor, the control loop response, and the hysteresis level between the turn-on and turn-off thresholds. The power delivered during a burst period will average out to the mid-point between the two hysteresis thresholds.

For a topology that delivers power proportional to Optical Feedback signal, such as the DCM Flyback Converter, use of the described Burst mode control approach is widely known and used.

An LLC converter has a control characteristic in which the Optical Feedback characteristic modifies LLC switching frequency, which in turn defines the voltage gain between input and output of the converter. This means that the level of Optical Feedback signal is primarily a function of input to output voltage ratio rather than being related to load power. This voltage gain feedback characteristic, or more particularly the lack of a delivered power versus feedback characteristic, prevents the use of the well known Burst control method described above.

BRIEF DESCRIPTION OF THE DRAWINGS

Further aspects of the invention will appear from the appending claims and from the following detailed description given with reference to the appending drawings.

DETAILED DESCRIPTION

An inner feedback loop is added to the primary side controller. The purpose of this inner feedback loop is to adjust the LLC operating frequency as required to make the power drawn by the LLC converter proportional to the optical feedback signal. Once this has been done burst mode operation can be implemented in using the conventional approach of adding start and stop thresholds on the optical feedback signal to initiate and terminate the Burst periods.

Figure 1:
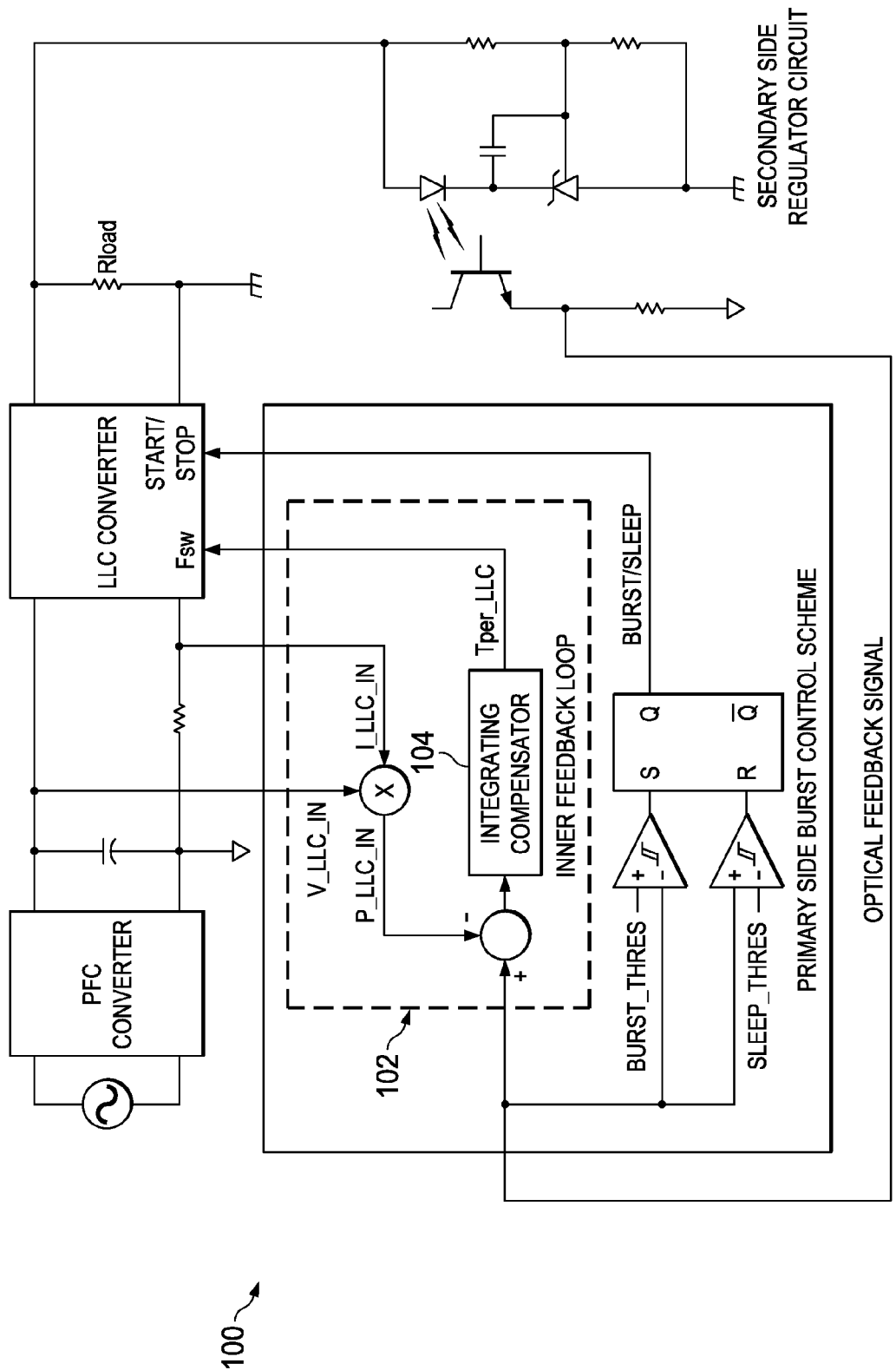
FIG. 1 shows a control block diagram illustrating one implementation of the invention.
Figure 2:
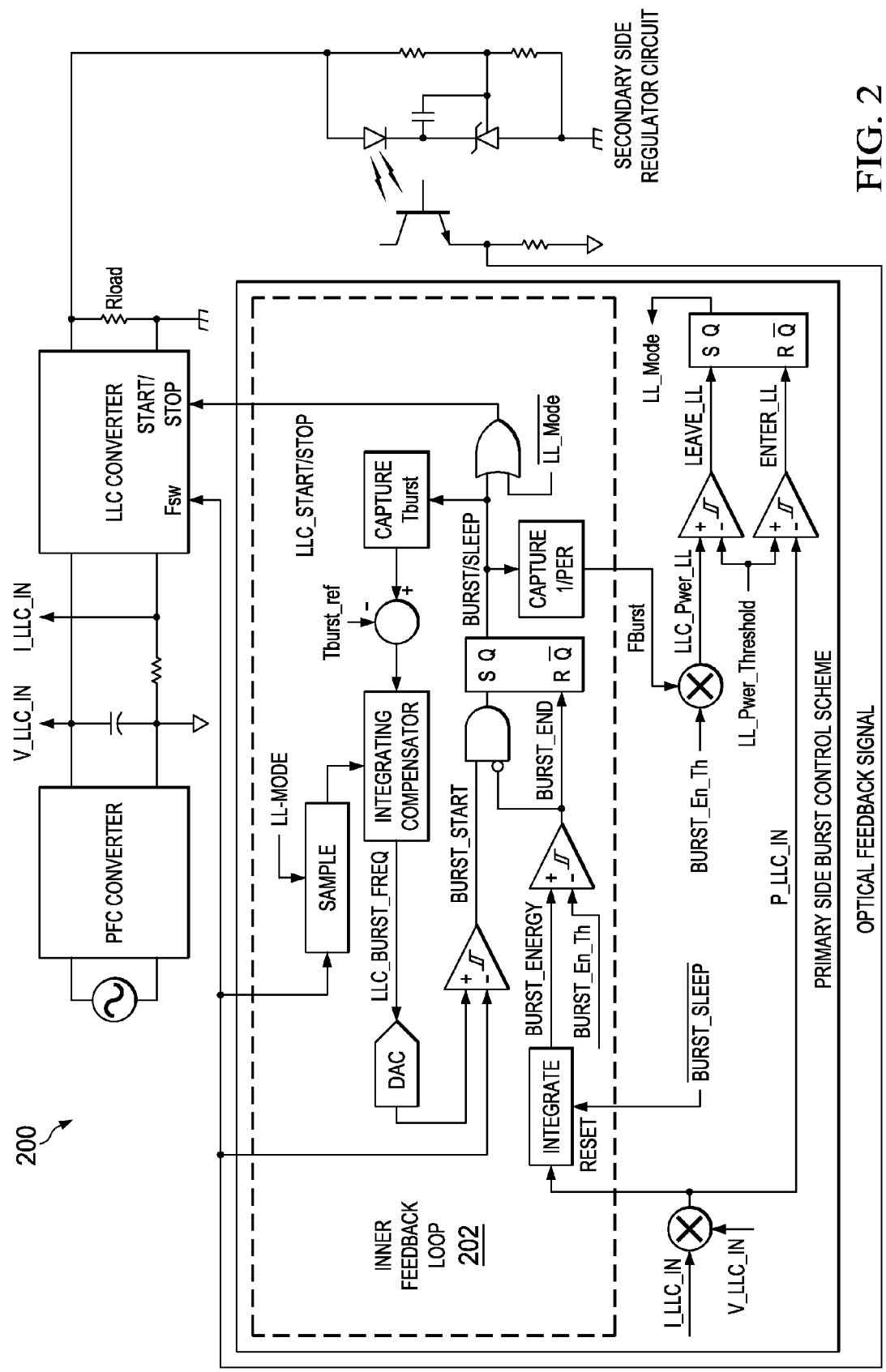
FIG. 2 shows a control block diagram illustrating one alternative implementation of the invention.

A control block diagram illustrating one implementation of the proposed invention is illustrated in FIG. 1, generally as 100. It is possible to achieve the same result in a number of different ways. FIG. 2 illustrates an alternative way to achieve a similar result. A key component of both implementations is the inner feedback loop 102, 202 encircled on FIGS. 1 and 2 by the dotted/dashed lines. The purpose of this feedback loop is to ensure that the switching frequency during Burst operation is adjusted such that the Burst power is controlled to achieve good light load efficiency, regardless of the voltage ratio that currently exists between the input and output of the LLC converter.

The Invention Implementation illustrated in FIG. 1 uses an Inner Feedback Loop 102 with an Integrating Compensator 104 to continually adjust the LLC switching frequency such that the Optical Feedback signal is proportional to power delivered into the LLC Converter (which approximately equal to the load power). By forcing this link between Optical Feedback signal and delivered power, the inner feedback loop makes it possible to implement a primary side Burst control scheme using simple thresholds on the Optical Feedback signal to start and stop the switching action of the LLC Converter. This approach cannot be applied to an LLC Converter without the inner feedback loop due to its voltage gain control characteristic.

The alternative Implementation of the Invention, illustrated in FIG. 2, generally as 200, achieves a similar result. Instead of changing the relationship between the Optical Feedback signal and the LLC switching frequency, it adjusts the threshold on the Optical Feedback signal which causes the Burst to be initiated. The overall result is the same because it enables the inner feedback loop to adjust the LLC frequency that will apply during burst operation to reflect the voltage gain currently applied to the LLC converter. In this way the Burst control algorithm can control the level of power that is delivered during each Burst. The alternative implementation terminates a burst period after a fixed amount of energy has been delivered to the LLC converter. In this way it can limit the output voltage ripple to a level suitable for the load system. The alternative implementation requires a more complex system for moving into and out of light load (Burst Mode) operation which is also illustrated in FIG. 2.

What is claimed is:

1. An LLC converter comprising:
   a primary side burst control circuit; and
   a secondary side regulator circuit;
   wherein the primary side burst control circuit comprises an inner feedback loop circuit for adjusting the LLC operating frequency to control the power drawn by the LLC converter proportional to an optical feedback signal; and
   wherein the inner feedback loop comprises an integrating compensator to continually adjust the LLC switching frequency so that an optical feedback signal is proportional to power delivered to the LLC converter.

2. The LLC converter of claim 1, wherein the burst mode operation is implemented by adding start and stop thresholds on an optical feedback signal to initiate and terminate the burst periods.

3. The LLC converter of claim 1, wherein the optical feedback signal is proportional to the load power.

4. The LLC converter of claim 1, wherein the inner feedback loop adjusts a threshold on an optical feedback loop to cause a burst to be initiated.

5. An LLC converter comprising:
   a primary side burst control circuit; and
   a secondary side regulator circuit;
   wherein the primary side burst control circuit comprises an inner feedback loop circuit for adjusting the LLC operating frequency to control the power drawn by the LLC converter proportional to an optical feedback signal,
   wherein the inner feedback loop adjusts a LLC frequency that will apply during burst mode operation to reflect current gain control currently applied to the LLC converter.

6. An LLC converter comprising:
   a primary side burst control circuit; and
   a secondary side regulator circuit;
   wherein the primary side burst control circuit comprises an inner feedback loop circuit for adjusting the LLC operating frequency to control the power drawn by the LLC converter proportional to an optical feedback signal;
   wherein the inner feedback loop comprises an integrating compensator to continually adjust the LLC switching frequency so that an optical feedback signal is proportional to power delivered to the LLC converter; and
   wherein the inner control loop terminates a burst period after a predetermined amount of energy has been delivered to the LLC converter.

* * * * *